UNITED STATES PATENT OFFICE.

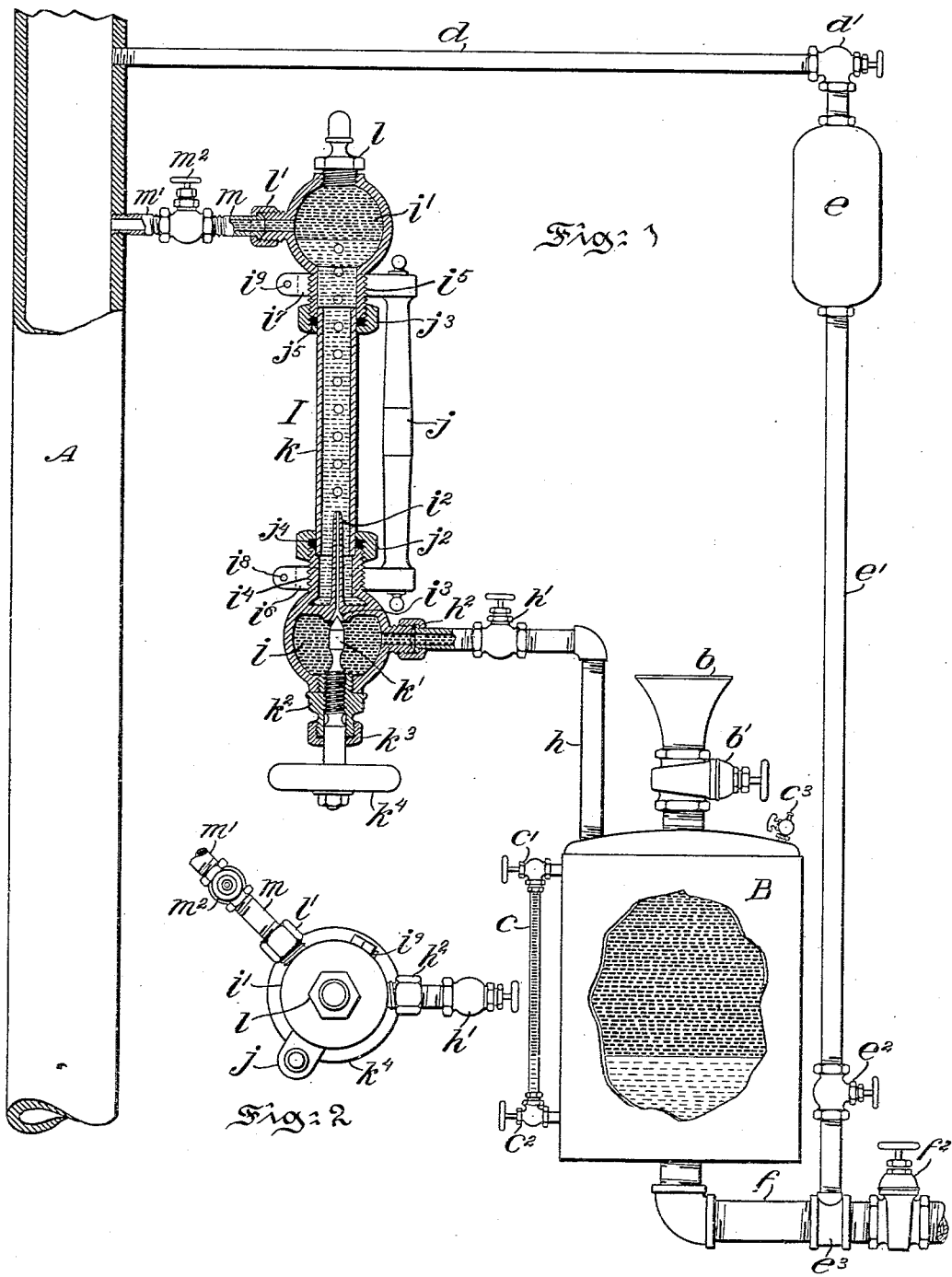

GOTTLOB BINDER, OF PHILADELPHIA, PENNSYLVANIA.

LUBRICATOR.

SPECIFICATION forming part of Letters Patent No. 504,700, dated September 12, 1893.

Application filed June 27, 1893. Serial No. 478,938. (No model.)

*To all whom it may concern:*

Be it known that I, GOTTLOB BINDER, a citizen of the United States, residing at the city of Philadelphia, in the county of Philadelphia and State of Pennsylvania, have invented certain new and useful Improvements in Steam-Engine Lubricators, of which the following is a specification.

My invention relates to sight feed lubricators; and more particularly to the construction and arrangement thereof.

The principal objects of my invention are first, to provide a comparatively simple, durable, inexpensive and effective sight-feed lubricator; second, to provide a sight feed lubricator for steam engines having the parts thereof so arranged as to be readily adjusted to different positions as well as quickly detached for repairs and other purposes; third, to provide a sight-feed lubricator so constructed and arranged as that the lubricant is delivered to and discharged from the same into contact with steam by hydrostatic pressure exerted upon the lubricant; fourth, to provide a sight-feed lubricator so constructed and arranged as that the lubricant is delivered thereto by the pressure of steam upon a body of oil or similar substance and the discharge therefrom maintained under perfect control or regulation; fifth, to provide a sight-feed lubricator having the parts thereof arranged so as to permit of the same being caused to assume different positions with respect to the location of the steam engine and of the tank or reservoir containing the lubricant controlled by hydrostatic pressure with respect to its discharge into and through the lubricator to the volume or body of steam of the engine; sixth, to provide a detachable sight-feed lubricating device with means for regulating or governing the quantity of the lubricant automatically conducted therethrough to the parts of the engine to be lubricated; seventh, to provide a detachable sight-feed lubricator connected with a steam-pipe and with a tank for containing a lubricant, the construction and arrangement being such that the hydrostatic pressure exerted upon the body of lubricant contained in the tank automatically controls by means connected with the lubricator the discharge of the lubricant therefrom in streams, jets or drops into a body or volume of steam for effecting lubrication of the parts of an engine or other appliance; and eighth, to provide a sight-feed lubricator so constructed and arranged as that waste of the lubricant is entirely avoided and uniformity in action with respect to the admission and discharge of the lubricant therethrough is regulated for enhancing the lubricating action by contact of steam therewith preparatory to presenting the same to the parts of the engine or other appliance to be lubricated.

My invention consists of a detachable sight-feed lubricator for feeding a lubricant to an engine and provided with means for regulating the admission of the lubricant thereto and discharge of the same therefrom; and my invention further consists of the improvements hereinafter described and claimed.

The nature and general features of my invention will be more fully understood from the following description taken in connection with the accompanying drawings forming part hereof; and in which—

Figure 1, is a view partly in section and partly in elevation of a detachable sight-feed lubricating apparatus embodying the features of my invention shown in application to a steam supply pipe and a lubricant tank or reservoir, and also showing pipe connections with an interposed elevated condensing chamber between the steam supply pipe and tank or reservoir, whereby through hydrostatic pressure exerted the admission and discharge of the lubricant is permitted through the lubricator under due regulation with the avoidance of waste in the presentation of the same to the volume or body of steam; and Fig. 2, is a top or plan view of the sight-feed lubricator of my invention as illustrated in Fig. 1, with the outlets thereof leading to the steam supply pipe and to the tank or reservoir occupying different positions with respect to each other and this view serving to illustrate the manner in which this apparatus may be set due to the construction and arrangement thereof.

Referring to the drawings A, is a steam supply pipe connected with an engine or similar appliance.

B, is a tank or reservoir adapted to contain a lubricant, and provided with a funnel-shaped pipe $b$, having a plug cock $b'$, connected therewith.

$c$, is a gage provided with stop-cocks $c'$ and $c^2$, and connected with the tank B, for ascertaining the quantity of oil and water from time to time therein.

$c^3$, is a pet-cock extending into the head of the tank or reservoir B, for exhausting air from the same.

$d$, is a pipe connected with the steam pipe A, having an angular valve $d'$, connected with an elevated condensing-chamber $e$, and from which chamber is a pipe $e'$, provided with a stop-cock $e^2$, which by a T-union or coupling device $e^3$, is connected with a pipe $f$, extending into the bottom of the tank B. This pipe $f$, is provided with a plug stop-cock $f^2$, for permitting of the discharge of the contents of the tank or reservoir B, and for enabling the same to be refilled with oil or any other lubricant.

From the tank B, extends a pipe $h$, provided with a cut-off valve $h'$, which by means of a union or coupling $h^2$, is connected with a lubricating device I. This lubricating device comprises two globe valves or chambers $i$ and $i'$. The lower chamber or valve is provided with a tapering jet-tube $i^2$, having preferably a conical-shaped mouth $i^3$, for a purpose to be presently fully explained. The globe valves or chambers $i$ and $i'$, have formed integral therewith threaded necks $i^4$ and $i^5$, to which are suitably attached the divided collars $i^6$ and $i^7$, provided with tightening screws $i^8$ and $i^9$, of a bracket or post $j$.

Interposed between the globe valves or chambers $i$ and $i'$, is a glass-tube or bulb $k$, suitably secured into the necks $i^4$ and $i^5$, of the respective globe valves or chambers $i$ and $i'$, and held to place in the respective necks thereof by means of nuts $j^2$ and $j^3$, detachably secured thereto.

Between the extremities of the respective necks and nuts applied to the threaded exterior surface thereof, are packing rings or gaskets $j^4$ and $j^5$, in order to provide a tight joint between the glass-tube or bulb $k$ and necks of the valves or chambers $i$ and $i'$. The jet-tube $i^2$, formed preferably integral with the interior of the lower globe valve or chamber $i$, is provided with a flaring or conical shaped lower extremity $i^3$, and with a tapering or contracted upper extremity and into which lower extremity engages a plug-valve $k'$, engaging the surface of a threaded screw plug $k^2$, provided with a gasketed cap $k^3$, and a hand-wheel $k^4$, for permitting of the due regulation of the movement of the plug valve $k'$, with respect to the admission and passage of the lubricant through the jet-tube $i^2$, into the glass bulb or tube $k$, kept filled with water or other fluid in the manner, for example, as illustrated in Fig. 1.

$l$, is a screw-plug secured into the upper globe chamber $i'$, for affording the means whereby access may be had to the interior thereof for repairs, cleaning and other purposes, as occasion may require.

$l'$, is a union or coupling for connecting the sections of pipe $m$ and $m'$, provided with a stop-cock $m^2$, with the steam supply pipe A.

The mode of operation of the apparatus hereinbefore described is as follows:—The lubricant is introduced into the tank B, through the hopper $b$, by opening the plug-cock $b'$. It being understood, however, that the stop-cock $e^2$, in the pipe $e'$, is first shut off, as well as the plug stop cock $f^2$, in the discharge pipe $f$, and the pet-cock $c^3$, in the head of the tank or reservoir B, is opened to allow of the escape of any air therefrom. After filling the tank with a lubricant through the funnel-shaped pipe $b$, in the manner hereinbefore explained, the cock $b'$, in the neck of the funnel-shaped pipe $b$, is closed, and the stop-cocks $e^2$ and $h'$, are opened, thereby permitting the steam from the supply pipe A in its passage through the pipe $d$, to the condensing chamber $e$, to flow therefrom in its condensed state through the pipes $e'$ and $f$, into the tank or reservoir B, thereby raising and forcing the lubricant from the tank through the pipe $h$, into the lower globe valve or chamber $i$, and by the operation of the plug-valve $k'$, by means of the hand-wheel $k^4$, with respect to its engagement with the lower extremity of the jet-tube $i^2$, the lubricant under due regulation is permitted to flow through the same and the column of water contained in the neck $i^4$, of the chamber $i$, and the glass bulb or tube $k$, as well as through the neck $i^5$, of the globe valve or chamber $i'$, in the form of a stream, bubble, jet or other similar form, and automatically delivered in such form to the volume or body of steam in its passage through the steam supply pipe A, for being conveyed thereby to the parts of the engine to be lubricated. The condensing chamber $e$, is preferably located at some distance above the lubricating device, in order that by hydrostatic pressure the lubricant may be a positive action and with due regularity be presented to the volume or body of steam, where the lubricant commingles with and is conducted by the steam to the parts of the engine to be lubricated as hereinbefore explained. By inspection of the sight gage $c$, at all times it can be readily ascertained when the oil in the tank B, is being or has been withdrawn by the filling of the same with water, which latter may be withdrawn therefrom by cutting off the stop-cocks $e^2$ and $h'$, in the pipes $e'$ and $h$, and opening the plug-cock $f^2$, in the discharge pipe $f$, whereupon the tank B, may be again filled by opening the plug-cock $b'$, in the funnel-shaped pipe $b$, in a well understood manner.

Among the many advantageous features of the apparatus such as hereinbefore described, may be mentioned that as the several parts thereof are readily detachable, by simply loosening the set-screws $i^8$ and $i^9$, of the divided arms of the bracket or post $j$, the same may be caused to assume such a position as that the lubricant fed to the engine or cylinder is at all times visible; and moreover, the globe valves $i$ and $i'$ thereof, may be quickly adjusted by loosening the nuts $j^2$ and $j^3$, as hereinbefore explained so that the apparatus may be set so as to compensate for the varying conditions and positions of the tank and steam supply with respect to each other, as illustrated in Fig. 2; and furthermore the construction and arrangement of the appliance is such as to permit of the same being readily detached for cleaning out or for repairs thereto by shutting off the stop-cocks $d'$, $h'$ and $m^2$, and releasing the unions or coupling devices $l'$ and $h^2$, from their complemental pipe connections, and the flow of lubricant through the device may be lessened or increased ad libitum by the simple regulation of the plug-valve $k'$, by means of its hand-wheel $k^4$.

Having thus described the nature and objects of my invention, what I claim as new, and desire to secure by Letters Patent, is—

1. The combination with a steam supply, a reservoir or tank for containing a lubricant and means for controlling the supply of steam and discharge of the lubricant from the tank or reservoir, of a detachable lubricating device, comprising two globe valves or chambers with necks, a detachable fluid tube supported in said necks by means of gasketed nuts, a detachable split-ring supporting bracket connected with the necks of said globe-valves or chambers, a jet-tube formed integral with one of said globe-valves and provided with a valve for regulating the flow of lubricant through said jet-tube, substantially as and for the purposes set forth.

2. The combination with a steam supply, an oil reservoir, means for permitting of the admission and discharge of a lubricant therefrom, and a controlled gage and pet-cock connected therewith, of a lubricating device, comprising two globe-valves with necks, a jet-tube and hand controlled valve therefor, connected with one of said valves or chambers, a fluid-tube fitting the necks of said valves or chambers, a vertical post provided with two-part rings with tightening means embracing the necks of said valves or chambers, and means, substantially as described, for automatically controlling the flow of lubricant through said device, substantially as and for the purposes set forth.

3. The combination, in a lubricating device, of two globe-valves or chambers provided with threaded-necks, having a glass tube or bulb fitted thereto and detachably connected therewith, a bracket provided with split rings with securing means detachably connected with the necks of said valves or chambers, a reducing jet-tube chamber extending into said bulb and integrally connected with one of said valves or chambers, and means, substantially as described, engaging with said jet-tube chamber for permitting of the regulation of the flow of the lubricant through said device, substantially as and for the purposes set forth.

4. The combination, in a sight feed lubricator, of a bracket or post provided with two-part detachable arms with tightening means, globular valves or chambers, nuts detachably secured to the walls of said chambers, and one of said chambers provided with a jet-tube having a tapering orifice and a plug valve with an operating device detachably connected with a screw-plug removably engaging the wall of one of said valves or chambers, substantially as and for the purposes set forth.

5. The combination, with a steam-supply, and a tank provided with means for admitting a lubricant thereto and permitting of the discharge of the same therefrom, of a condenser and suitable pipe connections interposed between said steam supply and tank and a detachable sight-feed lubricator interposed between said tank and steam supply and comprising two globe-valves with necks supporting a glass fluid-tube, nuts secured to the necks of said valves, a vertical post with two-part rings and securing means connected therewith, a regulating valve with a hand-wheel connected with a reducing jet tube formed integral with a casting in the bottom globe-valve and extending into said glass tube for regulating the flow under pressure of the lubricant therethrough, substantially as and for the purposes set forth.

In testimony whereof I have hereunto set my signature in the presence of two subscribing witnesses.

GOTTLOB BINDER.

Witnesses:
THOMAS M. SMITH,
RICHARD C. MAXWELL.